United States Patent [19]

McKinley et al.

[11] 3,998,049

[45] Dec. 21, 1976

[54] STEAM GENERATING APPARATUS

[75] Inventors: Roe L. McKinley; Jack M. McKinley, both of Longview, Tex.; Martin Kirsch, Jr., Shreveport, La.

[73] Assignee: G & K Development Co., Inc., Shreveport, La.

[22] Filed: Sept. 30, 1975

[21] Appl. No.: 618,051

[52] U.S. Cl. ............................. 60/39.55; 60/595; 123/46 R
[51] Int. Cl.² .................. F02B 71/00; F02B 71/06
[58] Field of Search ............ 60/39.05, 39.55, 595; 123/46 R, 46 B; 417/340

[56] References Cited

UNITED STATES PATENTS

| 2,693,076 | 11/1954 | Francis | 60/624 |
| 2,863,426 | 12/1958 | Summerlin | 60/595 |
| 3,073,108 | 1/1963 | Ward | 123/46 B |
| 3,751,905 | 8/1973 | McKinley et al. | 60/39.55 |

Primary Examiner—Carlton R. Croyle
Assistant Examiner—L. J. Casaregola
Attorney, Agent, or Firm—Imirie, Smiley & Linn

[57] ABSTRACT

Improved apparatus for generating a high pressure mixture of steam and combustion gases for utilization by a steam engine or the like. The apparatus includes a combustion cylinder and an accumulator cylinder of substantially equal diameter, with both cylinders interconnected at each end by pipes of substantially equal diameter to form a closed loop. A first pair of opposed free pistons is movable toward and away from each other in the combustion cylinder and a second pair of opposed free pistons is movable toward and away from each other in the accumulator cylinder. The space between the first pair of pistons comprises a combustion chamber, while the space between the second pair of pistons comprises an operating accumulator chamber filled with a compressible fluid. A hydraulic fluid is present behind the pistons in the cylinders and their interconnecting pipes in communication with a high pressure hydraulic fluid source which causes the accumulator pistons to compress the fluid in the accumulator which is then used to drive the power pistons together to heat and compress an air charge in the combustion chamber. Fuel is injected and ignites and thereafter water is injected and spontaneously vaporizes to steam. The steam-gas mixture drives the power pistons outwardly, displacing the hydraulic fluid to the accumulator. An exhaust valve at the combustion chamber then opens, and the combustion chamber pistons, driven by accumulator pressure, force the steam-gas mixture from the apparatus to a utilization device.

10 Claims, 2 Drawing Figures

STEAM GENERATING APPARATUS

BACKGROUND OF THE INVENTION

1. Field of the Invention

The present invention relates generally to steam generating apparatus, and more particularly to such apparatus for efficient generation of high pressure steam and gases for use in driving engines and other utilization devices.

2. Description of the Prior Art

Steam operated engines have long been recognized as an efficient and effective source of power for many diverse applications. However, in many instances, steam engines have found very limited acceptance in view of their complexity, their large size, their substantial fuel requirements, or their detrimental exhaust emissions. It has also been recognized that many of the underlying problems in connection with providing a more compact, less cumbersome, and less costly steam engine have arisen from the difficulty of providing a satisfactory source of high pressure, high pressure steam.

Conventional boilers and the like are relatively impractical for many applications in terms of both size and weight, and moreover are a source of high air pollution. Other, more sophisticated, steam generation techniques have also been proposed in recent years, and again have proven to exhibit substantial limitations and disadvantages, and frequently are simply too complex and expensive to be practical.

U.S. Pat. No. 3,751,905 represents a substantial advance and discloses a steam-gas generating apparatus wherein a cylinder defining a combustion chamber cooperates with a hydraulic accumulator to enable the generation of high pressure, high temperature steam. It has been discovered, however, that while such approach effectively generates high pressure, high temperature steam, overall operating efficiency is limited by the design of the hydraulic accumulator system with the result that less steam than might be desired is produced.

SUMMARY OF THE INVENTION

It is, therefore, an object of the present invention to efficiently generate high pressure, high temperature steam for use by a steam engine or other utilization device.

The present invention has a further object in the construction of an improved steam generating apparatus in which a combustion cylinder and a substantially equal diameter accumulator cylinder are interconnected to form a closed loop of compact overall configuration.

The steam generating apparatus according to the present invention is summarized as including a combustion cylinder and a pair of opposed power pistons movable inwardly and outwardly within the combustion cylinder, the space between the pistons defining a combustion chamber. Hydraulic fluid is present in separate chambers behind each power piston, the fluid in each chamber communicating through an unrestricted fluid flow path of substantially equal diameter to that of the combustion cylinder with an accumulator piston. Thus, an accumulator piston is provided for each of the power pistons, the space between accumulator and power pistons being filled with hydraulic fluid. A closed chamber containing compressible fluid is provided for each of the accumulator pistons, and a hydraulic control system regulates the pressure in the hydraulic fluid during operation of the apparatus. In addition, apparatus is provided for supplying compressed air, fuel, and water to the combustion chamber as well as for exhausting steam and combustion gases to a utilization device, and the entire system is operated by a sequencing apparatus to provide cyclic operation. A governor is responsive to steam pressure within a storage chamber at the output of the system and, upon sensing excessive pressure, provides an output signal connected to the sequencing assembly for interrupting the cyclic operation of the apparatus until the pressure decreases to within a safe range.

The present invention is considered to be advantageous over the prior art in that it produces a high output of steam, is relatively compact in design, is relatively simple to construct and maintain, requires minimal fuel input, and exhibits improved exhaust emission qualities.

Other objects and advantages of the present invention will become apparent from the following description of a preferred embodiment when taken in conjunction with the accompanying drawings.

DESCRIPTION OF THE PREFERRED EMBODIMENT

Figure 1:
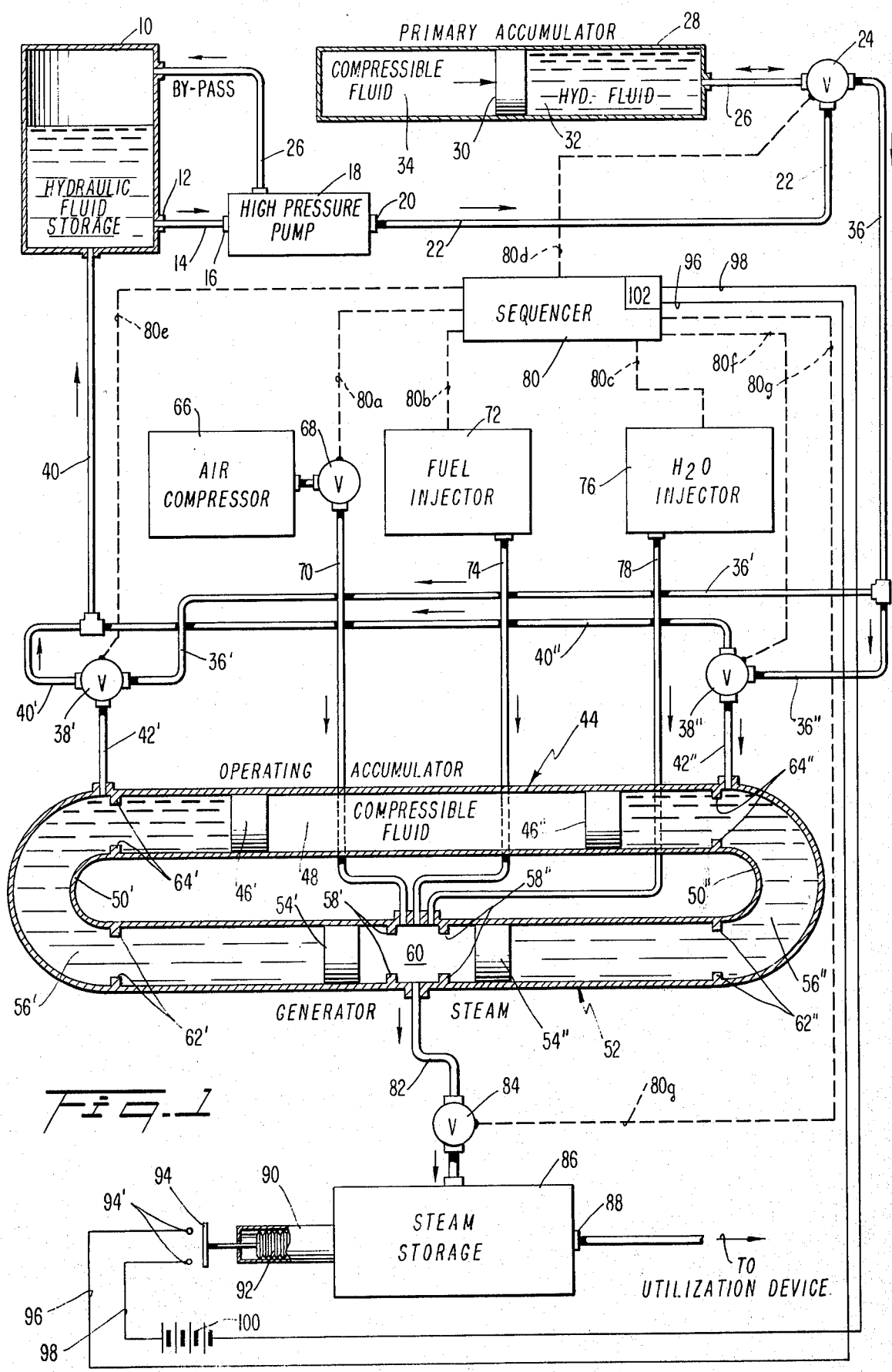
FIG. 1 is a schematic, partially sectional view of steam generating apparatus in accordance with the present invention, with portions of the apparatus appearing in block form.

Referring specifically to FIG. 1 which schematically depicts the steam generating apparatus according to the present invention, the apparatus includes a storage tank or chamber 10 for hydraulic fluid such as oil. Hydraulic storage tank 10 has an outlet port 12 connected by a line 14 to the inlet port 16 of a high pressure, hydraulic pump 18. The output of high pressure pump 18 at port 20 is connected by a line 22 to a multi-position valve 24. A by-pass line 26 also connects a relief port of the pump 18 with the hydraulic storage chamber 10 to prevent excessive pressure buildup in the supply line 22.

The valve 24 is connected by a line 26 with a primary accumulator 28 which comprises a cylinder within which a piston 30 is free floating and divides the cylinder into a hydraulic fluid pressure chamber 32, in communication with the line 26, and a compressible fluid chamber 34. Preferably, the compressible fluid in this case is nitrogen gas. The valve 24 also is connected with a line 36 that includes two branches 36' and 36" respectively leading to valves 38' and 38". Valves 38' and 38" are also connected by lines 40' and 40", respectively, which are joined together and are connected by return line 40 to the hydraulic fluid storage tank 10.

Valves 38' and 38" respectively are in communication by lines 42' and 42" with the opposite end portions of an operating accumulator 44, preferably in the form of a cylinder and containing two free floating pistons 46' and 46" which define therebetween a compressible fluid chamber 48. The opposite ends of the accumulator 44 are connected by arcuate passageways 50' and 50" with the opposite ends of a generator 52, also preferably in the form of a cylinder, and which contains two spaced free floating pistons 54' and 54". The area between the pistons 46' and 54', within arcuate passageway 50' and the adjacent ends of accumulator 44 and generator 52 comprises a hydraulic fluid chamber 56'. Likewise, the opposite passageway 50" and the adjacent ends of accumulator 44 and generator 52 comprise a hydraulic fluid chamber 56" between pistons 46" and 54".

While the accumulator 44 has been shown as a single unit, a pair of accumulators, one for each power piston 54', 54", may be utilized. In such case, the individual accumulators, with individual compressible fluid containing chambers, may be positioned at alternate ends of generator 52 with connecting lines appropriately modified so that the entire structure is generally S-shaped rather than in the closed loop form shown in FIG. 1.

The generator 52 is provided with spaced inner stops 58' and 58" intermediate the pistons 54' and 54" to define between such stops a combustion and steam generating chamber 60. The generator 52 is also provided with spaced outer stops 62' and 62" which define the limits of outward movement of pistons 54' and 54" and preclude the pistons from entering the passageways 56' and 56", respectively. A similar pair of stops 64' and 64" are disposed at the ends of accumulator 44 and define the limit of outward movement of pistons 46' and 46", respectively.

The combustion and steam generating chamber 60 includes water, fuel and compressed air intakes as well as an exhaust steam outlet. The air supply may comprise a compressor 66 connected by a solenoid actuated valve 68 and a line 70 to the chamber 60. A fuel injector 72 may be connected to the chamber 60 by a line 74, and water injection means 76 may be connected to the chamber 60 by a line 78. The operation of the compressor valve 68, fuel injector 72, and water injection means 76 may be controlled by a sequencer 80 which also may control the hydraulic valves 24, 38' and 38", as indicated by broken lines 80a, 80b, 80c, 80d, 80e, and 80f.

The chamber 60 is connected by an exhaust line 82 and valve 84 to a steam storage chamber 86 that includes an outlet port 88 supplying a device, such as a turbine, steam engine or the like. The valve 84 is connected to the sequencer by a line 80g.

At the center of cylinder 52, a radially enlarged collar portion is present. The various inlet and outlets to combustion chamber 60 feed in at such collar portion. In particular, the air inlet line 70 including solonoid operated inlet valve 68 feeds in at such collar; similarly, outlet line 82 and its controlling valve 84 feeds outwardly from the collar portion. In addition, fuel injector 72 and water injector 76 both feed their respective products into combustion chamber 60 at the collar portion via feed lines 74, 78. Opening and closing of the various valves is controlled by sequencer 80, which provides electrical signals to the control relays of these solonoid-operated valves to accomplish the desired valving sequences. Sequencer 80 also provides timed electrical signals for activating the fuel injection 72 and water injector 76 at points in time appropriate for delivery of their products to the combustion chamber. Sequencer 80 preferably comprises a simple motor driven rotating cam shaft, the camed surfaces of which periodically activate microswitches for the several valves and injection systems. This type of control system is well-known in the art and further details are not described for the sake of brevity.

The steam storage chamber 86 is provided with a safety control or governor to prevent the accumulation of excessive steam pressure. The control or governor conveniently may comprise a chamber 90 in communication with the storage chamber 86 and containing a pressure responsive element, such as a spring biased bellows and piston 92 or the like adapted for actuating a switch member 94 engagable with switch contacts 94'. Contacts 94' are connected by wires 96 and 98 through a suitable source of operating potential, such as battery 100, to a main cut-off switch 102 of the sequencer 80 controlling the application of operating potential to each of the valves 24, 38', 38", 68 and 84. Thus, if the steam storage pressure becomes excessive, the piston 92 is extended to close the switch 94, 94' and actuate switch 102 to close all valve in the system. In this manner, further operation of the generator is prevented until the pressure within the storage chamber 86 is reduced to a safe range, whereupon the switch 94, 94' is opened and the generator again is allowed to run.

A fuller understanding of the operation of the present invention may best be had by following a cycle of operation in the apparatus of FIG. 1. Initially, a cycle is started with pistons 54' and 54" at the inner end of their travel and seated against the stops 58' and 58", respectively, so that they are about one-eighth of an inch apart. Air valve 68 is then opened to inject air under pressure from the air compressor 68 into the combustion chamber 60, the hydraulic valve 38' and 38" being positioned to pass liquid from the chambers 56' and 56", respectively, via lines 42, 42" and 40', 40", to line 40 and thence to the storage chamber 10. At this point in the cycle, the steam outlet hydraulic valve 84 is closed.

The entry of air under pressure into chamber 60 drives the pistons 54' and 54" apart and they in turn force the liquid in chambers 56' and 56" back to the hydraulic storage chamber 10. Since the hydraulic fluid may be hot as a result of work performed thereon, it may be passed through a heat exchanger (not shown) before being returned to storage. This sequence continues with pistons 54' and 54" being driven apart to their maximum separation. During this stage, the master valve 24 establishes communication between lines 22 and 26 so that the fluid pressure is maintained by pump 18 in chamber 32 of the primary accumulator 28, the line 36 being closed. The compressible fluid in chamber 34 is thus pressurized.

The sequencer 80 then operates to close valve 68 whereupon the supply of compressed air to the chamber 60 is cut off. At this same time, the sequencer positions valve 24 so as to establish communication between both lines 22 and 26 from pump 18 and accumulator 28, respectively, to line 36. The sequencer also positions valves 38' and 38" to close the return lines 40' and 40" and establish communication between lines 36', 36" and lines 42', 42", respectively, so as to supply hydraulic fluid under pressure from line 36 to the chambers 56' and 56", respectively. The fluid under pressure thus forces the pistons 54' and 54" toward each other to about 12 inches apart.

The compression of air in chamber 60 caused by the inward movement of the pistons 54', 54" raises the temperature of the air in the chamber to fuel combustion range. At this point, the valves 38', 38" are closed by sequencer 80 to block the egress of hydraulic fluid through lines 42', 42'', and the fuel injector 72 is actuated to inject fuel into the chamber 60. The fuel charge is then immediately fired due to the elevated temperature within the combustion chamber 60. Such fuel, in accordance with the present invention, preferably comprises a low-cost, medium-weight hydrocarbon, typically kerosene or a diesel grade oil. While but a single line 74 is shown delivering such fuel in chamber 60, any number of injecting heads may be provided at the combustion chamber.

The exploding fuel charge drives the pistons 54', 54'' outwardly and raises the temperature in the chamber to the water evaporation range. Into this extremely hot, high pressure expanding charge, water is now injected by the actuation of water injector 76 by the sequencer 80. This water, entering by one or more nozzles, is immediately evaporated to steam, creating high pressure, high temperature steam-gas mixture and driving pistons 54' and 54'' to their extreme outer limits. Since valves 38' and 38'' are closed, the fluid within chambers 56' and 56'' transmits the movement of pistons 54', 54'' to pistons 46', 46'' in the operating accumulator 44. As a result, the compressible fluid within chamber 48 is highly pressurized.

When the pistons 54' and 54'' have moved all the way to their outer limits, and the fluid within chamber 48 has been compressed, the steam valve 84 is opened by the sequencer 80 to supply super-heated steam to storage 86, the compressed gas in chamber 48 forcing the pistons 54' and 54'' toward the inner stops 58', 58'' to expel all of the steam. While valve 84 and line 82 are once again shown, for simplicity, as singular elements, a plurality of outlet ports may be used at the combustion chamber if desired. During that portion of the cycle when pistons 54', 54'' are moving toward the stops 58', 58'', the sequencer 80 causes valve 38' and 38'' to again establish communication between lines 42', 42'' and the fluid pressure supply lines 36', 36''. Pressurized fluid from the primary accumulator 28 and the pump 18 thus assists the operating accumulator 44 in assuring that pistons 54', 54'' move all the way into stops 58', 58''. The steam valve 84 is then closed and the cycle is repeated.

As noted above, during operation of the present invention, high pressure, high temperature steam is supplied to the steam storage chamber 86 from which it is fed to the utilization device. If the steam pressure within the storage chamber 86 should exceed a preselected value, piston 92 will cause switch 94, 94' to complete the circuit from power source 100 to the control switch 102 of sequencer 80. This causes the sequencer 80 to close all of the valves in the system thus interrupting the normal sequencing of the cycle and preventing additional pressurized steam from being supplied to storage 86. Thereafter, as the pressure within storage tank 86 is reduced, the switch 94, 94' will once again be opened and the system will resume the normal sequence.

Sequencer 80 can take any number of suitable forms and, for example, may comprise a series of rotary switches or camactuated switches each connected to one of the valves and injectors and driven by an electric motor. In such case, switch 102 can be connected to the power supply line feeding the rotary switch motor such that actuation of the switch causes the motor to stop and interrupts the sequencing of the system of course, it should be appreciated that any number of alternative connections may be provided to interrupt the normal sequencing in response to the closure of switch 93, 94', consistent with the present teachings. Further, switch 94, 94' may be connected directly to one or more of the valves in the system to control those individual valves in a manner which will interrupt the normal running of the generating apparatus.

Figure 2:
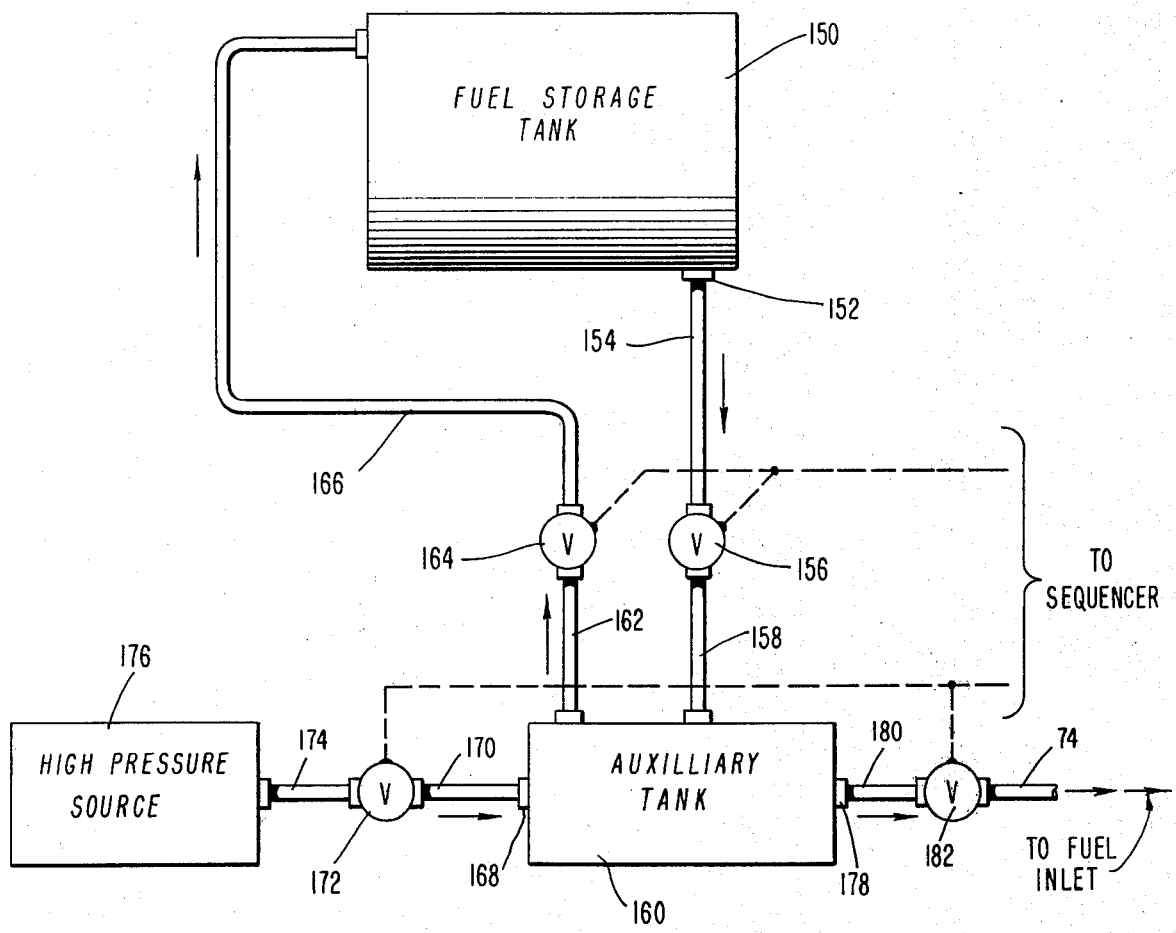
FIg. 2 is a schematic block diagram of the fuel injector of the apparatus of FIG. 1.

Fuel injector 72 also may be of any suitable type in which a fuel charge is supplied to chamber 60 in response to an electrical signal over line 80b. One such fuel injector is illustrated in block diagram form in FIg. 2 and includes a fuel storage tank 150 having an outlet 152 connected over line 154 to a solenoid controlled valve 156. Valve 156 in turn supplies via line 158 an auxiliary fuel storage tank 160. Tank 160 is provided with a return or overflow path comprising a line 162, a solenoid actuated valve 164 and a line 166 communicating with the main fuel storage tank 150. A port 168 in one end of auxiliary tank 160 is connected by a line 170 with another solenoid actuated valve 172 which communicates over line 174 with a source 176 of high pressure compressed air. The outlet port 178 of auxiliary tank 160 is coupled by line 180 to a solenoid actuated valve 182 which feeds line 74 leading to the fuel inlet of combustion chamber 60.

Valves 156 and 164 are tied together as are valves 172 and 182, with both sets of valves coupled to the sequencer 80 for sequential actuation. In operation, valves 172 and 182 are initially closed while valves 156 and 164 are opened. Fuel is then supplied from the storage tank 150 to the auxiliary tank 162, with any overflow being returned back to the tank 150 through valve 164. Thereafter, valves 156 and 164 are closed, the auxiliary tank 160 having been primed with a fuel charge for the next combustion sequence. At the point in the cylce when the fuel charge is to be supplied to combustion chamber 60, valves 172 and 182 are simultaneously opened whereupon the high pressure source 176 causes the fuel charge in tank 160 to be rapidly discharged into the combustion chamber 60. Valves 172 and 182 are then closed and the sequence repeated for a subsequent charge.

It should be understood that the pistons 54', 54'', 46', and 46'' are preferably sealed from the cylinder walls by piston rings (not shown) or similar means well-known in the art, so that no communication is possible between opposite sides of a piston. Likewise, each of the various valves described above may be of any suitable type responsive to electrical input signals from the sequencer 80 to cause the various valving operations required in the sequence. As noted, the sequencer 80 provides the necessary electrical signals to operate the control relays of the solenoid operated valves and also provides timed electrical signals for activating the fuel injector 72 and the water injector 76 at the appropriate points in the cycle. While the sequencer preferably comprises a simple motor driven switching system, alternative arrangements are also contemplated such as the use of integrated circuit, solid state control. Sequencing arrangements of this general type are well-known in the art and, thus, need not be illustrated in detail.

Because of the very high pressures and temperatues which exist within the chamber 60, almost total combustion of the fuel charge occurs so that only minor amounts of unoxidized or lowly oxidized hydrocarbons remain in the steam-gas mixture exiting from the apparatus. As a result, the amount of air pollutants and noxious fumes resulting from the ultimate discharge of combustion products of the present apparatus is vastly reduced as compared to many conventional power plants. This anti-pollution aspect of the invention is augmented by the fact that additional quantities of pollutants as may form during the combustion process are absorbed by the steam and carried in the ultimate condensate, rather than being discharged into the atmosphere.

From the above, it can be appreciated that the present invention is capable of efficiently and effectively generating high pressure, high temperature steam for the operation of various steam driven devices. The apparatus is capable of rugged, low cost manufacture with relatively few working parts in comparison with typical prior art structures. Furthermore, by constructing passageways 56' and 56" of substantially equal diameter to both the generator cylinder 52 and the operating accumulator cylinder 44, no restrictions in the fluid flow path exist between the combustion pistons and the accumulator pistons. The elimination of restrictions in this fluid flow path allows the system to operate at peak efficiency and represents a substantial improvement. At the same time, the closed loop assembly of the combustion cylinder and accumulator cylinders is compact and enables the use of a single accumulator compression chamber 48 for both pistons. The use of an operating accumulator 44 in conjunction with a primary accumulator 28 also aids in maximizing system efficiency and assures that the combustion pistons 54', 54" will move through complete strokes between stops during each cycle.

Inasmuch as the present invention is subject to may variations, modifications and changes in detail, it is intended that all matter contained in the foregoing description or shown in the accompanying drawings shall be interpreted as illustrative and not in a limiting sense.

What is claimed is:
1. Steam generating apparatus, comprising:
   a combustion cylinder;
   a pair of opposed power pistons movable inwardly and outwardly in said combustion cylinder, the space therebetween defining a combustion chamber of said apparatus;
   accumulator means containing a compressible fluid for accumulating a pressure charge;
   means coupling said accumulator means with the ends of said combustion cylinder, said coupling means defining an unrestricted and continuously open fluid flow path having throughout its length a cross-sectional area substantially equal to that of said combustion cylinder for transfer of fluid between said combustion cylinder and said accumulator means with minimal resistance;
   a hydraulic fluid behind said power pistons in said combustion cylinder and said coupling means;
   means connected with said combustion cylinder for supplying compressed air, a fuel charge, and water to said combustion chamber and for exhausting said combustion chamber;
   hydraulic control means communicating with said hydraulic fluid for regulating the amount and pressure of said fluid behind said piston; and
   sequencing means actuating said supply and exhaust means and said hydraulic control means in a sequence cyclically to (1) provide said combustion chamber with compressed air so as to exhaust hydraulic fluid to said hydraulic control means and to provide an air charge in said combustion chamber, (2) supply hydraulic fluid under pressure against said power pistons to compress and heat said air charge, (3) admit a fuel charge to said combustion cylinder to ignite said fuel and drive the pistons outwardly, (4) inject water into the ignited fuel charge to vaporize the water into steam thereby increasing pressure driving said power pistons outwardly, said outward movement driving said hydraulic fluid into said accumulator means to compress the fluid therein, and (5) exhaust steam and gases when said power pistons reach the end of their stroke, the compressed fluid in said accumulator means causing said hydraulic fluid to flow through said coupling means to move said power pistons inwardly exhausting said steam and gases.

2. Steam generating apparatus, comprising:
   a combustion cylinder;
   a pair of opposed power pistons movable inwardly and outwardly in said combustion cylinder, the space therebetween defining a combustion chamber of said apparatus;
   accumulator means containing a compressible fluid for accumulating a pressure charge;
   means coupling said accumulator means with the ends of said combustion cylinder, said coupling means defining a fluid flow path having throughout its length a cross-sectional area substantially equal to that of said combustion cylinder for transfer of fluid between said combustion cylinder and said accumulator means with minimal resistance;
   a hydraulic fluid behind said power pistons in said combustion cylinder and said coupling means;
   means connected with said combustion cylinder for supplying compressed air, a fuel charge, and water to said combustion chamber and for exhausting said combustion chamber;
   hydraulic control means communicating with said hydraulic fluid for regulating the amount and pressure of said fluid behind said piston; and
   sequencing means actuating said supply and exhaust means and said hydraulic control means in a sequence cyclically to (1) provide said combustion chamber with compressed air so as to exhaust hydraulic fluid to said hydraulic control means and to provide an air charge in said combustion chamber, (2) supply hydraulic fluid under pressure against said power pistons to compress and heat said air charge, (3) admit a fuel charge to said combustion cylinder to ignite said fuel and drive the pistons outwardly, (4) inject water into the ignited fuel charge to vaporize the water into steam thereby increasing pressure driving said power pistons outwardly, said outward movement driving said hydraulic fluid into said accumulator means to compress the fluid therein, and (5) exhaust steam and gases when said power pistons reach the end of their stroke, the compressed fluid in said accumulator means causing said hydraulic fluid to flow through said coupling means to move said power pistons inwardly exhausting said steam and gases;
   said accumulator means including a pair of accumulator pistons, each associated with a respective one of said power pistons and communicating with said hydraulic fluid, movement of each of said power pistons causing corresponding movement of its associated accumulator piston by means of said hydraulic fluid.

3. Steam generating apparatus according to claim 1 wherein said coupling means comprises a pair of curved pipes, each having a diameter substantially equal to the diameter of said combustion cylinder, each of said pipes being directly connected to a respective end of said combustion cylinder and to said accumulator means.

4. Steam generating apparatus according to claim 3 wherein said curved pipes sweep a 180° arc.

5. Steam generating apparatus according to claim 1 wherein said hydraulic control means includes a primary hydraulic fluid accumulator, a source of high pressure fluid and a supply line connecting said source to said primary hydraulic fluid accumulator, first valving means in said supply line operable for pressurizing said primary hydraulic fluid accumulator, second valving means between said primary hydraulic fluid accumulator and said power pistons, said second valving means operable in a first position to apply the primary accumulator pressure to said pistons, and operable in a second position to vent fluid from behind said pistons.

6. Steam generating apparatus, comprising:
a combustion cylinder;
at least one power piston movable in said combustion cylinder and cooperating with said cylinder to define a combustion chamber of said apparatus in front of said piston; accumulator means containing a compressible fluid for accumulating a pressure charge;
means coupling said accumulator means with said combustion cylinder, said coupling means defining an unrestricted and continuously open fluid flow path having throughout its length a cross-sectional area substantially equal to that of said combustion cylinder for transfer of fluid between said combustion cylinder and said accumulator means with minimal resistance;
a hydraulic fluid behind said power piston in said combustion cylinder and said coupling means;
means connected with said combustion cylinder for supplying compressed air, a fuel charge, and water to said combustion chamber and for exhausting said combustion chamber;
hydraulic control means communicating with said hydraulic fluid for regulating the amount and pressure of said fluid behind said piston; and
sequencing means actuating said supply and exhaust means and said hydraulic control means in a sequence cyclically to (1) provide said combustion chamber with compressed air so as to exhaust hydraulic fluid to said hydraulic control means and to provide an air charge in said combustion chamber (2) supply hydraulic fluid under pressure against said power piston to compress and heat said air charge, (3) admit a fuel charge to said combustion cylinder to ignite said fuel and drive the piston outwardly, (4) inject water into the ignited fuel charge to vaporize the water into steam thereby increasing pressure driving said power piston outwardly, said outward movement driving said hydraulic fluid into said accumulator means to compress the fluid therein, and (5) exhaust steam and gases when said power piston reaches the end of its stroke, the compressed fluid in said accumulator means causing said hydraulic fluid to flow through said coupling means to move said power piston inwardly exhausting said steam and gases.

7. Steam generating apparatus, comprising:
a combustion cylinder;
a pair of opposed power pistons movable inwardly and outwardly in said combustion cylinder, the space therebetween defining a combustion chamber of said apparatus;
an accumulator cylinder;
a pair of opposed accumulator pistons movable inwardly and outwardly in said accumulator cylinder, the space therebetween defining a closed accumulator chamber;
a compressible fluid in said accumulator chamber;
a pair of curved pipes interconnecting adjacent ends of said accumulator and combustion cylinders to form a closed loop;
a hydraulic fluid behind said pistons in said accumulator and combustion cylinders and in said curved pipes;
means connected with said combustion cylinder for supplying compressed air, a fuel charge, and water to said combustion chamber and for exhausting said combustion chamber;
hydraulic control means communicating with said hydraulic fluid for regulating the amount and pressure of said fluid behind said pistons; and
sequencing means actuating said supply and exhaust means and said hydraulic control means in a sequence cyclically to (1) provide said combustion chamber with compressed air so as to exhaust hydraulic fluid to said hydraulic control means and to provide an air charge in said combustion chamber, (2) supply hydraulic fluid under pressure against said power pistons to compress and heat said air charge, (3) admit a fuel charge to said combustion cylinder to ignite said fuel and drive the pistons outwardly, (4) inject water into the ignited fuel charge to vaporize the water into steam thereby increasing pressure driving said power pistons outwardly, said outward movement driving said hydraulic fluid into said accumulator cylinder and driving said accumulator pistons inwardly to compress the fluid therebetween, and (5) exhaust steam and gases when said power pistons reach the end of their stroke, the compressed fluid in said accumulator driving said accumulator pistons outwardly so as to cause said hydraulic fluid to move said power pistons inwardly exhausting said steam and gases.

8. Steam generating apparatus according to claim 7 wherein said accumulator cylinder, said combustion cylinder, and said pair of curved pipes have substantially equal diameters.

9. Steam generating apparatus according to claim 1 further including
a combustion cylinder;
at least one power piston movable in said combustion cylinder and cooperating therewith to define a combustion chamber in front of said piston;
accumulator means containing a compressible fluid for accumulating a pressure charge;
means coupling said accumulator means with the ends of said combustion cylinder for transfer of fluid between said combustion cylinder and said accumulator means;
a hydraulic fluid behind said power piston in said combustion cylinder and said coupling means;
means connected with said combustion cylinder for supplying compressed air, a fueld charge, and water to said combustion chamber and for exhausting said combustion chamber;

hydraulic control means communicating with said hydraulic fluid for regulating the amount and pressure of said fluid behind said piston;

sequencing means actuating said supply and exhaust means and said hydraulic control means in a sequence cyclically to (1) provide said combustion chamber with compressed air so as to exhaust hydraulic fluid to said hydraulic control means and to provide an air charge in said combustion chamber, (2) supply hydraulic fluid under pressure against said power piston to compress and heat said air charge, (3) admit a fuel charge to said combustion cylinder to ignite said fuel and drive the piston outwardly (4) inject water into the ignited fuel charge to vaporize the water into steam thereby increasing pressure driving said power piston outwardly, said outward movement driving said hydraulic fluid into said accumulator means to compress the fluid therein, and (5) exhaust steam and gases when said power piston reaches the end of its stroke, the compressed fluid in said accumulator means causing said hydraulic fluid to flow through said coupling means to move said power piston inwardly exhausting said steam and gases;

governor means coupled with said exhaust means and said sequencing means and responsive to pressure from said exhaust means exceeding a preselected value to interrupt cyclic operation of said sequencing means.

10. Steam generating apparatus according to claim 9 wherein said governor means comprises a pressure responsive switch, and circuit means connecting said pressure responsive switch with said sequencing means.

* * * * *